United States Patent [19]

Ogura

[11] Patent Number: 5,495,343
[45] Date of Patent: Feb. 27, 1996

[54] IMAGE SIGNAL RECORDING AND REPRODUCING SYSTEM

[75] Inventor: Shigeo Ogura, Tokyo, Japan

[73] Assignee: Canon Kabushiki Kaisha, Tokyo, Japan

[21] Appl. No.: 286,808

[22] Filed: Aug. 4, 1994

Related U.S. Application Data

[63] Continuation of Ser. No. 13,159, Feb. 1, 1993, abandoned, which is a continuation of Ser. No. 661,516, Feb. 26, 1991, abandoned.

[30] Foreign Application Priority Data

| Mar. 7, 1990 | [JP] | Japan | 2-053517 |
| Mar. 7, 1990 | [JP] | Japan | 2-053518 |
| Mar. 7, 1990 | [JP] | Japan | 2-053519 |

[51] Int. Cl.[6] ........................... H04N 5/76; H04N 5/225; H04N 5/78
[52] U.S. Cl. .......................... 358/342; 358/335; 358/310; 358/906; 348/207; 360/33.1
[58] Field of Search ....................... 358/335, 310, 358/906, 342, 322, 320, 337, 323; 348/207, 220; 360/33.1, 35.1, 9.1, 22, 27, 32; H04N 5/76, 5/92, 5/225, 9/79

[56] References Cited

U.S. PATENT DOCUMENTS

| 4,541,020 | 9/1985 | Kimura | 358/906 |
| 4,591,930 | 5/1986 | Baumeister | 360/35.1 |
| 4,646,166 | 2/1987 | Arlan | 358/310 |
| 4,730,222 | 3/1988 | Schauffele | 360/33.1 |
| 4,750,057 | 6/1988 | Baumeister | 360/35.1 |
| 4,752,839 | 6/1988 | Lovely | 360/33.1 |
| 4,760,469 | 7/1988 | Biber et al. | 360/35.1 |
| 4,862,292 | 8/1989 | Enari et al. | 358/335 |
| 4,873,583 | 10/1989 | Kobayashi et al. | 358/335 |
| 4,887,169 | 12/1989 | Bannai et al. | 358/312 |
| 4,939,586 | 7/1990 | Nabati et al. | 358/342 |
| 4,963,991 | 10/1990 | Honjo | 358/335 |
| 5,079,637 | 1/1992 | Amano | 358/312 |
| 5,086,345 | 2/1992 | Nakane et al. | 358/909 |
| 5,119,208 | 6/1992 | Fujimoto | 358/906 |

FOREIGN PATENT DOCUMENTS

| 1177292 | 7/1989 | Japan | H04N 7/79 |

Primary Examiner—Thai Q. Tran
Attorney, Agent, or Firm—Robin, Blecker, Daley & Driscoll

[57] ABSTRACT

An image signal recording and reproducing system of this invention is arranged to record an image signal on a recording medium and to reproduce a recorded image signal from the recording medium. The system is provided with a first recording mode for recording an image signal for one picture having a first resolution on n recording tracks (n: positive integer) of the recording medium and a second recording mode for recording an image signal for one picture having a second resolution higher than the first resolution on m recording tracks (m: integer greater than n) of the recording medium. If an image signal recorded on the basis of the second recording mode is to be reproduced from the recording medium on which image signals are recorded in either one of the first and second recording modes, an arbitrary portion of an image corresponding to the image signal reproduced from the recording medium is extracted and outputted. The above-described arrangement makes it possible to reproduce image signals recorded in different recording modes irrespective of the kind of recording mode.

9 Claims, 7 Drawing Sheets

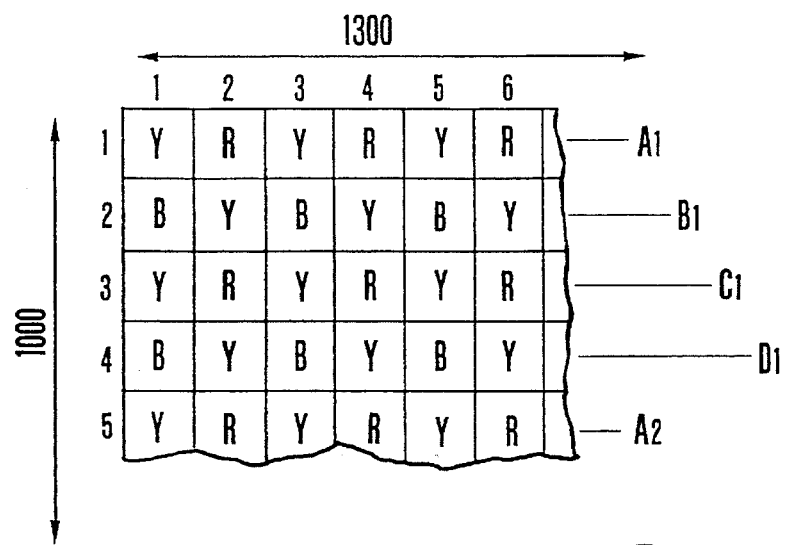
FIG. 2
(PRIOR ART)
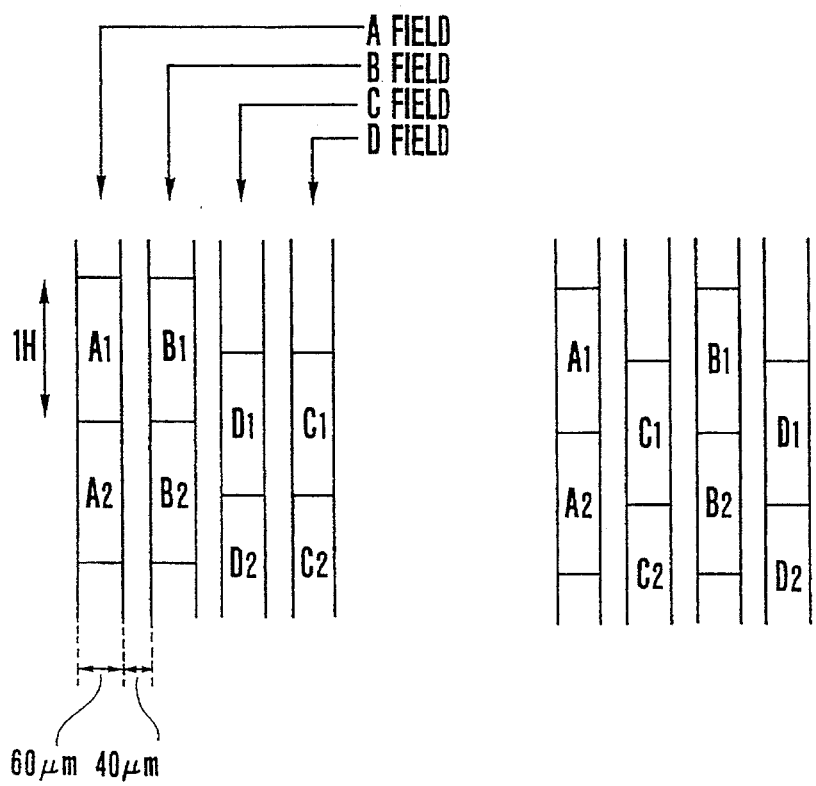
FIG. 3(a)
(PRIOR ART)
FIG. 3(b)
(PRIOR ART)

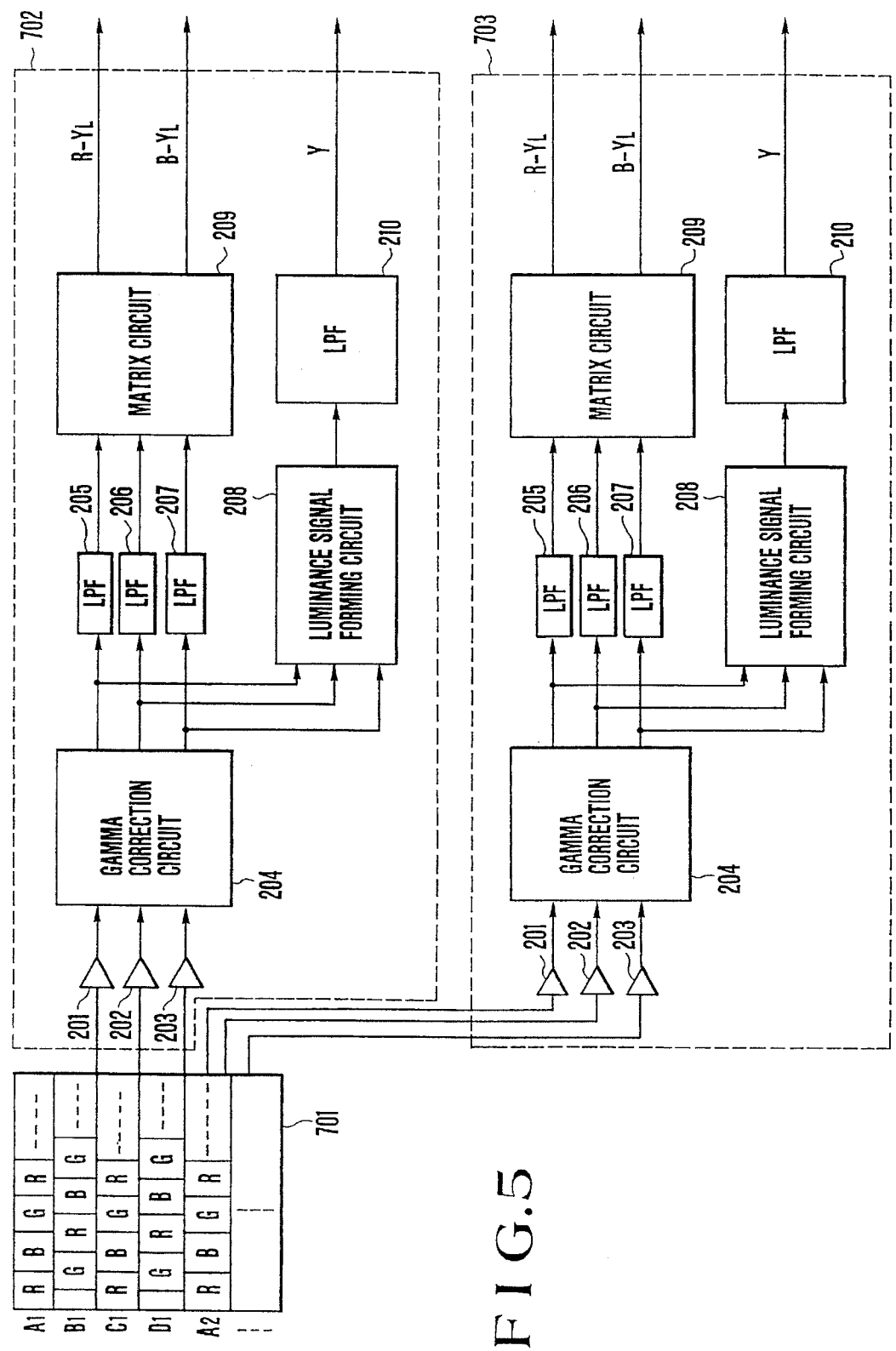
F I G. 5

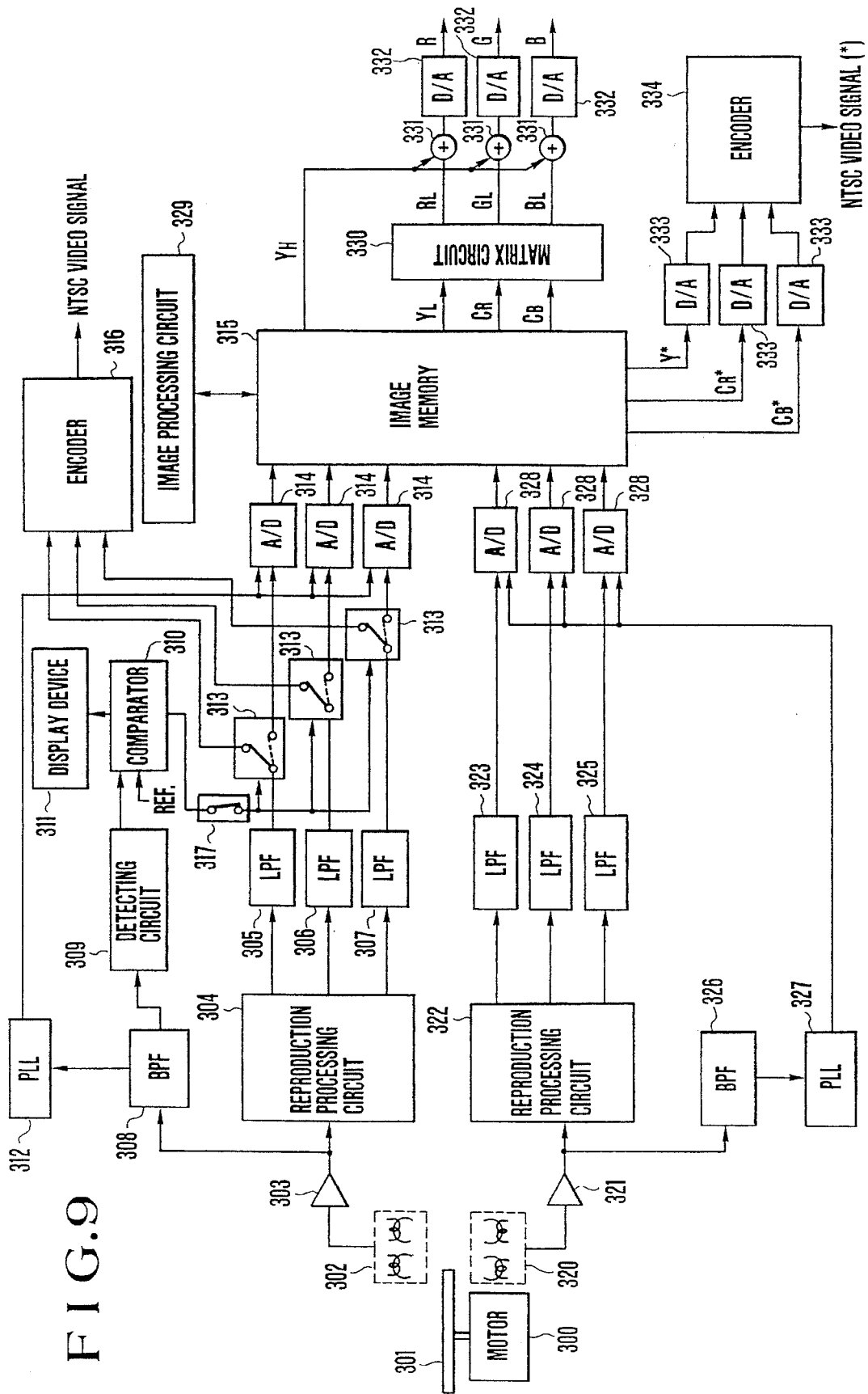

IMAGE SIGNAL RECORDING AND REPRODUCING SYSTEM

This is a continuation application under 37 CFR 1.62 of prior application Ser. No. 08/013,159, filed Feb. 1, 1993, now abandoned, which is a continuation of Ser. No. 07/661,516, filed Feb. 26, 1991 (now abandoned).

BACKGROUND OF THE INVENTION

1. Field of the Invention

The present invention relates to an image signal recording and reproducing system for recording an image signal on a recording medium and for reproducing a recorded image signal from the recording medium.

2. Description of the Related Art

Still video (SV) systems are conventionally known as one type of system for recording an image signal on a recording medium and for reproducing a recorded image signal from the recording medium. Such an SV system is arranged to form an image signal corresponding to a subject image by means of a solid-state image sensor such as a CCD-type image sensor or a MOS-type image sensor, to supply the resultant image signal to a signal processing circuit, and to record on a magnetic disk the image signal processed by the signal processing circuit.

FIG. 1 shows a schematic block diagram of the signal processing circuit of an SV system having a solid-state image sensor whose imaging surface is provided with R, G and B stripe filter elements.

Referring to FIG. 1, RGB signals are outputted from a solid-state image sensor 10 whose imaging surface is provided with R, G and B stripe filter elements, and the RGB signals are level-adjusted respectively by amplifiers 201, 202 and 203 so that the levels of the RGB signals become equal to one another when a white subject is imaged by the solid-state image sensor 10. Thereafter, the RGB signals are subjected to known gamma correction by a gamma correction circuit 204.

The RGB signals subjected to gamma correction are supplied to both a luminance signal forming circuit 208 and respective low-pass filters (LPF's) 205, 206 and 207. The luminance signal forming circuit 208 samples and holds each of the RGB signals and forms a wide-band luminance signal $Y_H$ through switching at predetermined timings. Subsequently, the wide-band luminance signal $Y_H$ outputted from the luminance signal forming circuit 208 is band-limited by a low-pass filter (LPF) 210 and outputted as a final luminance signal Y. In the meantime, the RGB signals supplied to the respective low-pass filters (LPF's) 205, 206 and 207 are band-limited and inputted to a matrix circuit 209. The matrix circuit 209 forms a narrow-band luminance signal $Y_L$ from the input RGB signals, and then forms and outputs two kinds of color-difference signals $R-Y_L$ and $B-Y_L$.

The luminance signal Y thus formed is frequency-modulated, while the color-difference signals $R-Y_L$ and $B-Y_L$ are converted into a color-difference line-sequential signal and then frequency-modulated. Subsequently, the luminance signal Y and the color-difference line-sequential signal are frequency-multiplexed and recorded on a magnetic disk called a video floppy disk. During reproduction, the recorded signal is reproduced from the video floppy disk by a reproducing apparatus, and a restored image signal is displayed on a television (TV) monitor as a visual image. Accordingly, the resolution of images attained by the aforesaid SV system is limited by the resolution of images obtainable with an existing TV system such as an NTSC system.

To improve the resolution of images of the existing TV system, a number of novel television systems, such as a high-definition television (HDTV) system, have recently been put into practice. Such a novel TV system has approximately 1,000 scanning lines and a horizontal signal band which can accommodate such a large number of scanning lines. Accordingly, in the field of SV systems, it is desired to develop a system capable of recording and reproducing a high-resolution still image of the order of 1,000 pixels×1,000 pixels (per square image area extracted from an entire picture) obtainable with the HDTV system or the like.

To meet the above-described demand, it has been proposed to provide a compatible high-definition still video (CHSV) system which can record and reproduce a high-resolution still image signal while retaining compatibility with conventional SV systems.

Such a CHSV system will be described in brief below.

FIG. 2 is a partial schematic view showing an example of the construction of a color filter attached to the imaging surface of an image sensor for use in the CHSV system. The color filter is attached to an image sensor having pixels the number of which is about 1,300 pixels× about 1,000 pixels, and consists of Y-signal filter elements which are arranged in a checkered manner and R- and B-signal filter elements which are arranged in line-sequential order. The CHSV system is arranged to form a luminance signal and a color-difference line-sequential signal by outputting, as described below, signals stored in the pixels of the image sensor to which is attached a color filter such as that shown in FIG. 2. More specifically, luminance signals for one field are formed by outputting the signals stored in pixels which are arranged on every fourth line, such as lines $A_1, A_2, \ldots$ In this manner, luminance signals for four fields including A, B, C and D fields which correspond to lines $A_i, B_i, C_i,$ and $D_i$ ($i$: positive integer) shown in FIG. 2, are formed.

As is known, color-difference signals $C_R$ and $C_B$ ($C_R = R-Y$, $C_B = B-Y$) need to be converted into a color-difference line-sequential signal. For instance, after the color-difference signal $C_R$ has been formed from the signals stored in the pixels of the line $A_1$ of FIG. 2, it is necessary to form the color-difference signal $C_B$ from the signals stored in the pixels of the line $B_1$. Accordingly, in the CHSV system, the signals stored in the pixels of even lines $A_{2n}$ and $B_{2n}$, $C_{2n}$ and $D_{2n}$ (n: integer) of each field are outputted in reverse order, respectively, to form a color-difference line-sequential signal.

After the thus-formed luminance signals and color-difference line-sequential signals for four fields are each frequency-modulated, these signals are multiplexed for each field. The multiplexed signals for four fields are respectively recorded on four successive tracks of a video floppy disk.

FIG. 3(a) is a schematic view showing a track recording pattern which is formed in a case where, after image signals for the A and B fields are simultaneously recorded through a two-channel head, the two-channel head is made to travel by two tracks to simultaneously record image signals for the C and D fields. FIG. 3(b) is a schematic view showing a track recording pattern which is formed in a case where a four-channel head is used to simultaneously record image signals for the A and B fields with a space for one track interposed therebetween and simultaneously record image signals for the C and D fields with the track on which the B field is recorded interposed therebetween.

If the two-channel head is used to effect recording, by reproducing the B and D tracks it is possible to reproduce a still image signal for one frame which conforms to a conventional TV system by means of a reproducing apparatus which conforms to a conventional SV format. If the four-channel head is used to effect recording, by reproducing the A and C tracks or the B and D tracks it is possible to reproduce a still image signal for one frame which conforms to a conventional TV system.

If a high-resolution still image signal is to be reproduced, the image signals for four fields recorded on the A to D tracks are fetched into a memory. The luminance signals and color-difference signals of the image signals are interpolated in the memory, and the resultant high-resolution still image signal is outputted from the memory.

The above-described type of conventional apparatus has a number of disadvantages. One disadvantage is that it is impossible to partially extract an arbitrary area from an image having a HDTV-grade resolution of the order of, for example, 1,000 vertical pixels, convert it into a video signal conforming to an existing TV system such as the NTSC system or a PAL system, and display the arbitrary area on a monitor or the like.

Another disadvantage of the conventional apparatus is that a user cannot determine whether an image signal reproduced by an image signal recording and reproducing system is an image signal reproduced by a conventional SV system, which can be displayed only on a monitor conforming to the existing TV system such as the NTSC or PAL system, or an image signal reproduced by the CHSV system, which can be displayed on both a monitor conforming to the existing TV system and a monitor conforming to the CHSV system. In the conventional apparatus having such a disadvantage, it is likely that an image signal reproduced by the CHSV system is displayed only on the monitor conforming to the existing TV system. If the user is to determine whether the reproduced image signal is an image signal reproduced by the CHSV system or the SV system, he himself must confirm whether it can be displayed on a CHSV-system monitor by supplying the signal thereto. For this purpose, the user must carry out extremely complicated operations.

The above-described CHSV system is capable of recording and reproducing a still image signal on the basis of not only a CHSV recording and reproducing mode for recording and reproducing a high-resolution still image signal by using four tracks in the above-described manner, but also a field recording and reproducing mode for recording a still image signal for one field on one track on the basis of a conventional SV format and for reproducing a still image for one picture conforming to a conventional TV system by using the still image signal for one field, or on the basis of a frame recording and reproducing mode for recording a still image signal for one frame over two tracks and for reproducing a still image for one picture conforming to the conventional TV system by using the still image signal for one frame. However, if a video floppy disk containing both a track having a still image signal recorded in a CHSV recording mode and a track having a still image signal recorded in a field or frame recording mode is to be reproduced, the following problems will be encountered: 1) if a high-image-quality monitor for displaying a high-resolution still image and a standard-image-quality monitor for a conventional TV system are not connected to the CHSV system, the still images recorded in these recording modes cannot be displayed; and 2) if both a high-image-quality monitor and a standard-image-quality monitor are connected to the CHSV system, a still image will be selectively displayed on either of the monitors in accordance with the kind of recording mode. This operation may be an extreme nuisance to a viewing person.

In addition, in the CHSV system, even if it is desired only to confirm the contents of the image recorded on each track of a video floppy disk, it takes a long time to output the contents to a monitor because the signal recorded in the CHSV recording mode is reproduced in a CHSV reproduction mode. Accordingly, the conventional arrangement does not fully utilize the advantage of the CHSV system—the ability to reproduce the signal recorded in the CHSV recording mode in the field or frame reproduction mode and display it on a standard-image-quality monitor.

SUMMARY OF THE INVENTION

It is, therefore, an object of the present invention to provide an image signal recording and reproducing system capable of solving the above-described problems.

Another object of the present invention is to provide an image signal recording and reproducing system capable of displaying on a monitor or the like an arbitrary portion of an image corresponding to a high-definition image signal.

To achieve the above-described objects, according to one aspect of the present invention, there is provided an image signal recording and reproducing system which is arranged to record an image signal on a recording medium and to reproduce a recorded image signal from the recording medium. The system includes recording means having a first recording mode for recording an image signal for one picture having a first resolution on n recording tracks (n: positive integer) of the recording medium and a second recording mode for recording an image signal for one picture having a second resolution higher than the first resolution on m recording tracks (m: integer greater than n) of the recording medium, the aforesaid recording means recording the image signal on the recording medium on the basis of either one of the recording modes, and image outputting means for extracting and outputting an arbitrary portion of an image corresponding to an image signal reproduced from the recording medium having image signals recorded on the basis of the second recording mode by the recording means.

Another object of the present invention is to provide an image signal recording and reproducing system which can determine in what mode an image signal has been recorded on a recording medium which is adaptable to recording in a plurality of different recording modes, and which can display the result of such decision.

To achieve the above-described object, according to another aspect of the present invention, there is provided an image signal recording and reproducing system arranged to record an image signal on a recording medium and to reproduce a recorded image signal from the recording medium. This system includes recording means having a first recording mode for recording an image signal for one picture having a first resolution on n recording tracks (n: positive integer) of the recording medium and a second recording mode for recording an image signal for one picture having a second resolution higher than the first resolution on m recording tracks (m: integer greater than n) of the recording medium, the aforesaid recording means recording the image signal on the recording medium on the basis of either one of the recording modes, and display means for providing display indicative of whether the image signal recorded by the recording means is an image signal recorded on the basis of the first recording mode or an image signal recorded on the basis of the second recording mode.

Another object of the present invention is to provide an image signal recording and reproducing system which can reproduce image signals in an identical reproduction mode even if they are recorded on a recording medium in different recording modes.

To achieve the above-described object, according to another aspect of the present invention, there is provided an image signal recording and reproducing system arranged to record an image signal on a recording medium and to reproduce a recorded image signal from the recording medium. This system includes recording means having a first recording mode for recording an image signal for one picture having a first resolution on n recording tracks (n: positive integer) of the recording medium and a second recording mode for recording an image signal for one picture having a second resolution higher than the first resolution on m recording tracks (m: integer greater than n) of the recording medium, the aforesaid recording means recording the image signal on the recording medium on the basis of either one of the recording modes, and image signal outputting means for outputting an image signal for one picture having the first resolution from the recording medium having image signals recorded by the recording means, on the basis of a first reproduction mode corresponding to the first recording mode.

The above and other objects, features and advantages of the present invention will become apparent from the following detailed description of a preferred embodiment of the present invention, taken in conjunction with the accompanying drawings.

BRIEF DESCRIPTION OF THE DRAWINGS

FIG. 2 is a partial schematic view of an example of the construction of a color filter attached to the imaging surface of an image sensor for use in a CHSV system;

FIG. 3(a) is a schematic view showing a track recording pattern which is formed on a video floppy disk by a two-channel head in a conventional CHSV system;

FIG. 3(b) is a schematic view showing a track recording pattern which is formed on a video floppy disk by a four-channel head in the conventional CHSV system;

FIG. 5 is a block diagram of a signal processing circuit for converting outputs from an image sensor having an imaging surface provided with a color filter of the type shown in FIG. 4 into a luminance signal and color-difference signals R-Y and B-Y which conform to an SV format;

FIG. 9 is a schematic block diagram showing the construction of a reproducing apparatus which is used in the embodiment of the image signal recording and reproducing system according to the present invention;

DETAILED DESCRIPTION OF THE PREFERRED EMBODIMENT

A preferred embodiment of the present invention will be described below with reference to the accompanying drawings.

Figure 4:
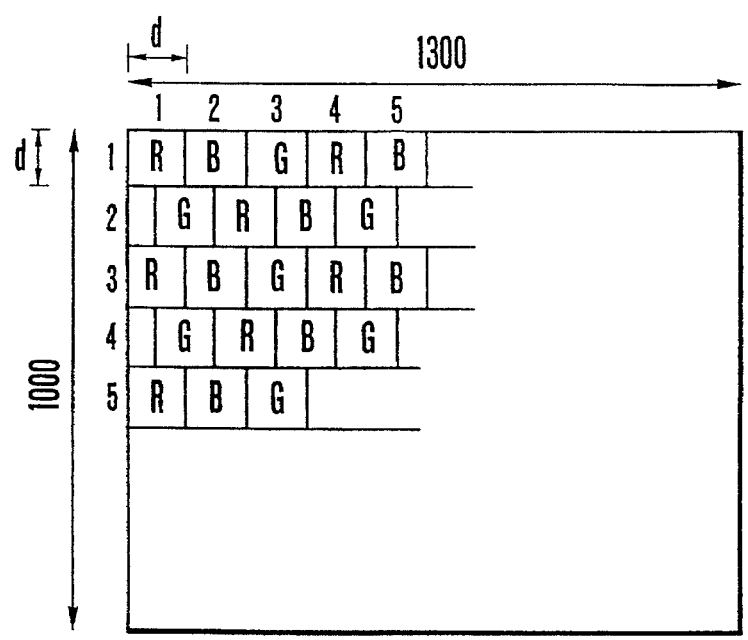
FIG. 4 is a partial schematic view showing one example of the construction of a color filter which is attached to an image sensor for use in one embodiment of an image signal recording and reproducing system according to the present invention.

FIG. 4 is a partial schematic view showing one example of the construction of a color filter which is attached to an image sensor for use in one embodiment of an image signal recording and reproducing system according to the present invention.

In the color filter of FIG. 4, the size of each pixel is d×d, and the image sensor used in the present embodiment has approximately a total of 1,300 pixels×1,000 pixels. Each odd line contains R, B and G color filter elements which are cyclically arranged in that sequence, and each even line contains G, R and B color filter elements which are cyclically arranged in that sequence. The cyclic sequence of G, R and B color filter elements on each even line is offset from that of R, B and G color filter elements on each odd line by a half pixel.

Figure 1:
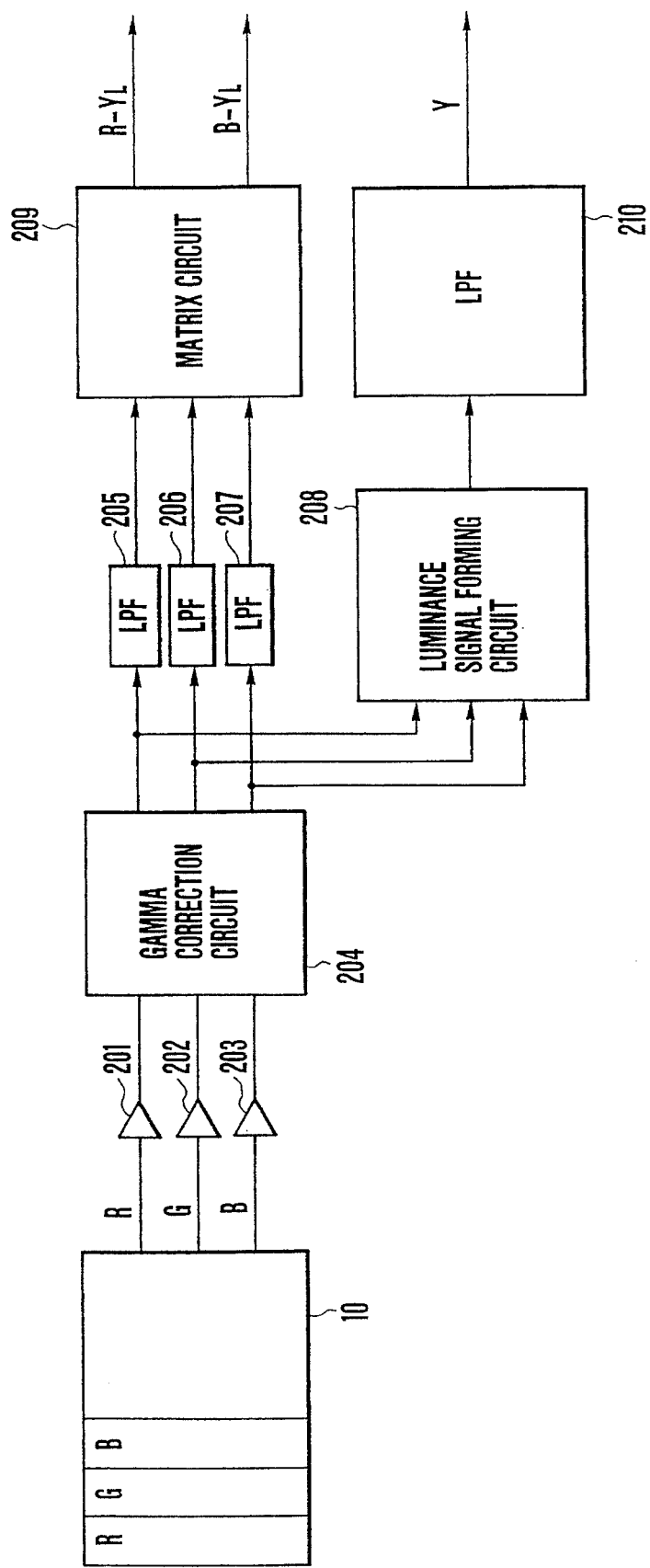
FIG. 1 is a schematic block diagram of the signal processing circuit of a conventional SV system.

FIG. 5 is a block diagram of a signal processing circuit for converting outputs from an image sensor 701 having an imaging surface provided with a color filter of the type shown in FIG. 4 into a Y signal and color-difference signals $C_R$ (R-$Y_L$) and $C_B$ (B-$Y_L$) which conform to an SV format. In FIG. 5, like reference numerals are used to denote elements which correspond to those of the arrangement shown in FIG. 1, and a detailed description thereof is omitted.

In the arrangement shown in FIG. 5, the image sensor 701 initially outputs the signals of $A_i$ and $B_i$ lines. The signal output of the $A_i$ line is supplied to a signal processing circuit 702, while the signal output of the $B_i$ line is supplied to a signal processing circuit 703. Each of the signal processing circuits 702 and 703 forms Y, $C_R$ and $C_B$ signals through an arrangement similar to that shown in FIG. 1. After the completion of processing for the $A_i$ and $B_i$ lines, the signals of $C_i$ and $D_i$ lines are outputted. The signal output of the $C_i$ line is supplied to the signal processing circuit 702, while the signal output of the $D_i$ line is supplied to the signal processing circuit 703. Each of the signal processing circuits 702 and 703 forms Y, $C_R$ and $C_B$ signals through an arrangement similar to that shown in FIG. 1.

In the above-described manner, according to the present embodiment, the signals of the respective $A_i$, $B_i$, $C_i$ and $D_i$ lines are individually subjected to signal processing, thereby forming image signals for four fields which conform to the SV format.

Figure 6:
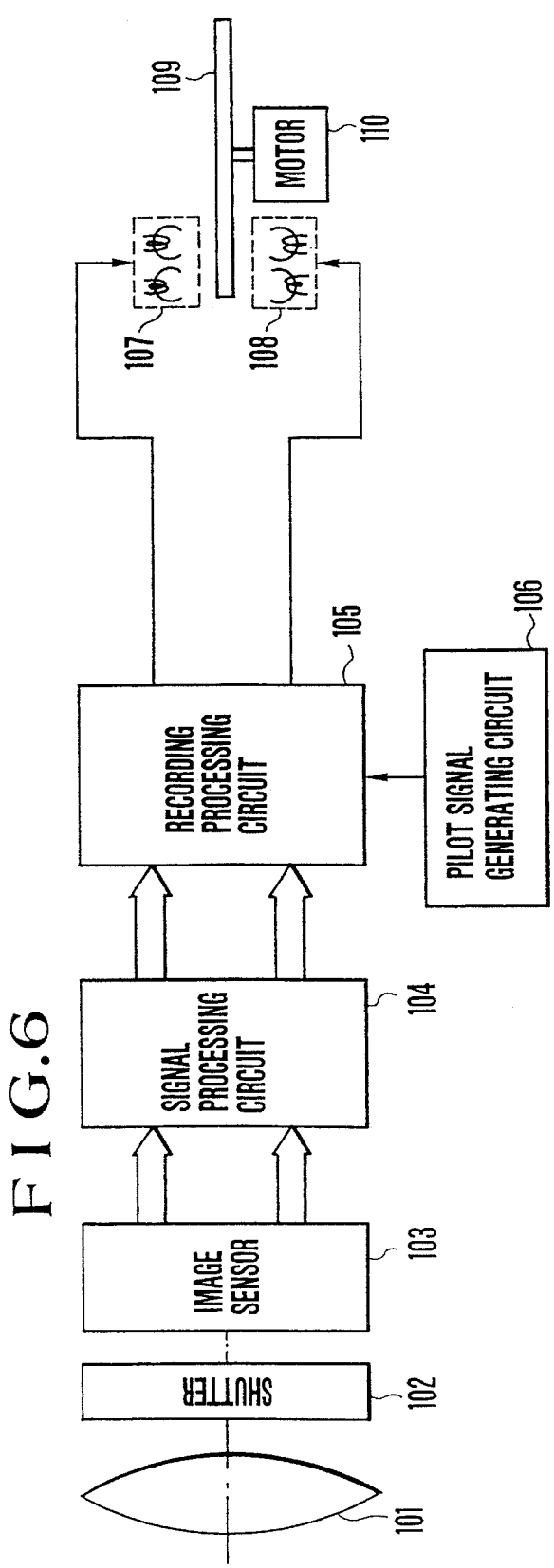
FIG. 6 is a schematic block diagram of a recording part for recording an image signal corresponding to a subject, which is used in the embodiment of the image signal recording and reproducing system according to the present invention.

FIG. 6 is a schematic block diagram of a recording part for recording an image signal corresponding to a subject, which is used in the embodiment of the image signal recording and reproducing system according to the present invention.

Figure 7:
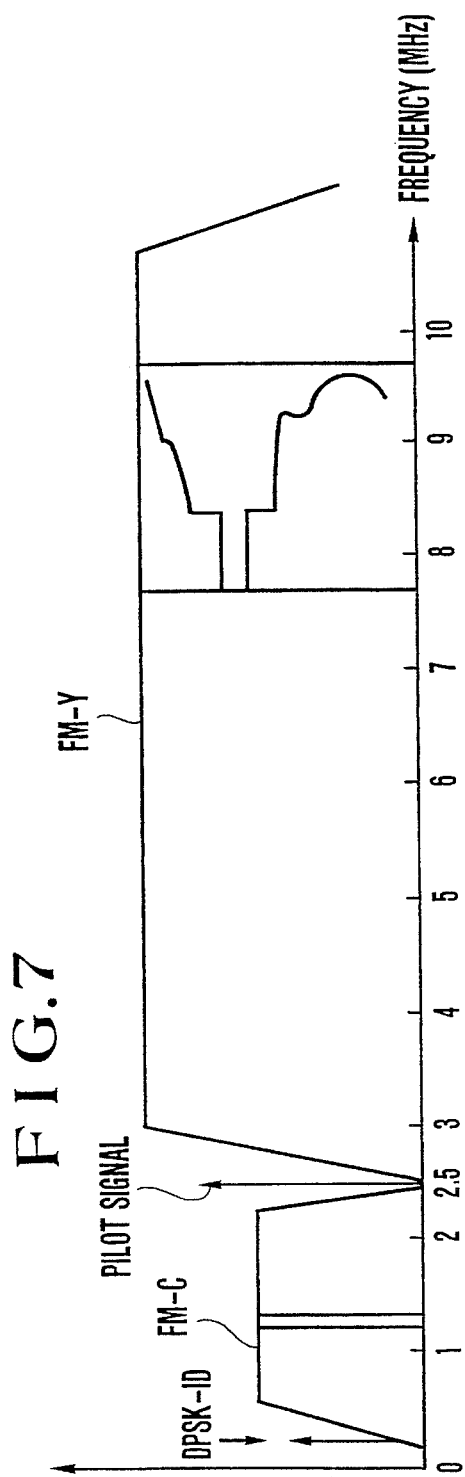
FIG. 7 is a schematic view showing the frequency allocation of a signal recorded on a video floppy disk in accordance with the present invention.

In the recording part shown in FIG. 6, a photographic subject image is conducted to the imaging surface of an image sensor 103 via a photographic optical system 101 and a shutter 102. The signals outputted from the image sensor 103, for example, the signals of the respective $A_i$ and $B_i$ lines or the respective $C_i$ and $D_i$ lines, are separately supplied to a signal processing circuit 104 in the above-described manner. In the signal processing circuit 104, the supplied signals are each converted into Y, $C_R$ and $C_B$ signals as shown in FIG. 5. Thereafter, in a recording processing circuit 105, the Y, $C_R$ and $C_B$ signals are separately subjected to recording processing. The Y signal is frequency-modulated, while the $C_R$ and $C_B$ signals are converted into a color-difference line-sequential signal, which is then frequency-modulated. Subsequently, the resultant signals are mixed with each other. At this time, a pilot signal for correction of time base variations which is generated by a pilot signal generating circuit 106 is multiplexed. The pilot signal is a sine-wave signal having a frequency of, for example, 2.5 MHz in the frequency allocation shown in FIG. 7. Then, signals corresponding to the $A_i$ and $C_i$ lines are recorded by a magnetic head 107 on the obverse side of a video floppy disk 109 which is being rotated by a motor 110, while signals corresponding to the $B_i$ and $D_i$ lines are recorded by a magnetic head 108 on the reverse side of the video floppy disk 109.

Figure 8A:
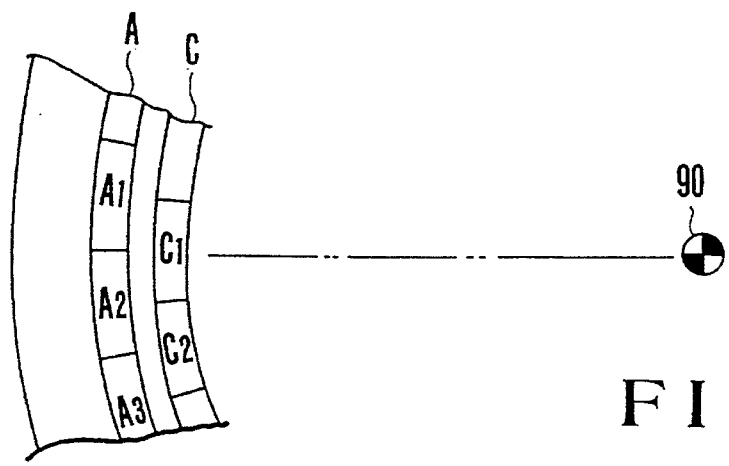
FIGS. 8(a) and 8(b) are schematic views showing the recording position of signals which are recorded on a video floppy disk.
Figure 8B:
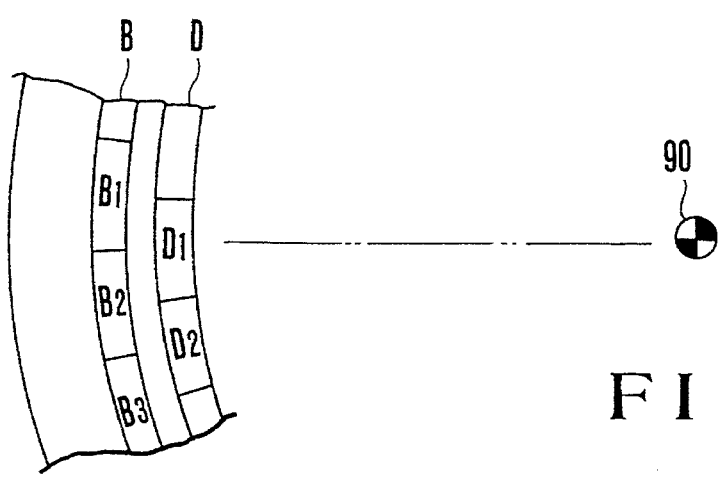

FIGS. 8(a) and 8(b) are schematic views showing the recording position of signals with respect to a video floppy disk. FIG. 8(a) shows a recording pattern which is formed on the obverse side of the video floppy disk. As shown in FIG. 8(a), the signals corresponding to the $A_i$ line are recorded on the track denoted by "A", while the signals corresponding to the $C_i$ line are recorded on the track denoted by "C". FIG. 8(b) shows a recording pattern which is formed on the reverse side of the video floppy disk. As shown in FIG. 8(b), the signals corresponding to the $B_i$ line are recorded on the track denoted by "B", while the signals corresponding to the $D_i$ line are recorded on the track denoted by "D". The distance between the A track and a rotational center 90 of the video floppy disk is equal to that between the B track and the rotational center 90, while the distance between the C track and the rotational center 90 is equal to that between the D track and the rotational center 90. Regarding the order of recording, after recording on the A and B tracks has simultaneously been performed, recording on the C and D tracks is simultaneously performed.

FIG. 9 is a schematic block diagram showing the construction of a reproducing apparatus which is used in the embodiment of the image signal recording and reproducing system according to the present invention. In the reproducing apparatus shown in FIG. 9, a signal, which is reproduced by a magnetic head 302 from the obverse side of a video floppy disk 301 which is being rotated by a motor 300, is supplied via a preamplifier 303 to a reproduction processing circuit 304 and a band-pass filter (hereinafter referred to as a "BPF") 308. The reproduction processing circuit 304 separates both a frequency-modulated luminance signal and a frequency-modulated color-difference line-sequential signal from the signal reproduced by the magnetic head 302. The reproduction processing circuit 304 applies predetermined processing, such as frequency demodulation and de-emphasis, to the frequency-modulated luminance signal. The reproduction processing circuit 304 also applies predetermined processing, such as frequency demodulation and de-emphasis, to the frequency-modulated color-difference line-sequential signal, and then effects conversion into simultaneous color-difference signals. In this manner, a reproduced Y signal, a reproduced $C_R$ signal and a reproduced $C_B$ signal are formed. The reproduced Y signal which has been formed in the above-described manner is passed through an LPF 305, while the reproduced $C_R$ and $C_B$ signals are passed through LPF's 306 and 307, respectively, whereby a signal containing an unnecessary frequency component is removed from each of the reproduced Y, $C_R$ and $C_B$ signals. The resultant signals are outputted from the LPF's 305, 306 and 307, respectively.

In the meantime, the signal outputted from the preamplifier 303 is also supplied to the BPF 308. The BPF 308 passes a signal having a frequency component of 2.5 MHz and supplies it to a detecting circuit 309 and a PLL circuit 312. The signal which has been detected by the detecting circuit 309 is supplied to a comparator 310. The comparator 310 detects whether the level of the signal outputted from the detecting circuit 309 has reached a predetermined level (reference level in the figure), thereby determining the presence or absence of a pilot signal within the signal reproduced from the video floppy disk 301. The result is displayed by a display device 311.

Figure 10:
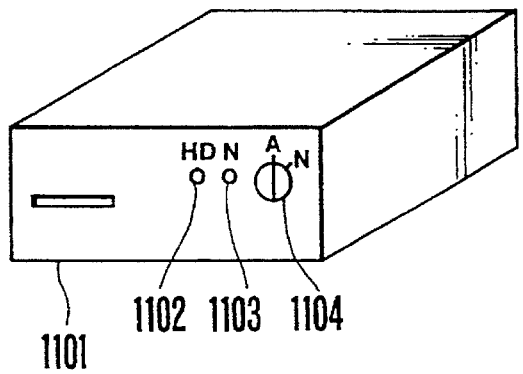
FIG. 10 is a schematic perspective view of an image signal recording and reproducing apparatus to which the embodiment of the present invention is applied.

FIG. 10 is a schematic perspective view of an image signal recording and reproducing apparatus to which the embodiment of the present invention is applied. An image signal recording and reproducing apparatus 1101 is provided with an HD mode indicator 1102 for indicating that a CHSV reproduction mode is in operation and an N mode indicator 1103 for indicating that a field or frame reproduction mode is in operation. If the comparator 310 detects the presence of a pilot signal, the HD indicator 1102 emits light. If the comparator 310 detects the absence of a pilot signal, the N indicator 1103 emits light. The image signal recording and reproducing apparatus 1101 is also provided with a selecting switch 1104 for selecting either an automatic display mode or a forced display mode. In the automatic display mode, a reproduced still image signal is automatically outputted to a high-image-quality monitor or a standard-image-quality monitor which is connected to the image signal recording and reproducing apparatus 1101 on the basis of the result of the decision made as to whether the CHSV reproduction mode or the field or frame reproduction mode is in operation. In the forced display mode, a reproduced still image signal is forcibly outputted to the standard-image-quality monitor irrespective of the result of the decision as to the reproduction mode. The selecting switch 1104 can be arbitrarily operated by an operator so that the automatic display mode or the forced display mode can be arbitrarily set in accordance with the intention of the operator.

The aforesaid display modes will be described below in more detail with reference to FIG. 9. The selecting switch 1104 shown in FIG. 10 corresponds to the switch 317 shown in FIG. 9. When the selecting switch 1104 shown in FIG. 10 is set to the shown "A" side, the switch 317 of FIG. 9 is turned on to select the automatic display mode. The state of connection of each switch 313 is controlled in accordance with the result of the comparison made by the comparator 310. More specifically, if the comparator 310 detects the presence of a pilot signal, the switches 313 are connected to corresponding A/D converters 314 and $Y_H$, $C_R$ and $C_B$ signals are inputted to the respective A/D converters 314. If the comparator 310 detects the absence of a pilot signal, the switches 313 are connected to an encoder 316 and the $Y_H$, $C_R$ and $C_B$ signals are inputted to the encoder 316. When the selecting switch 1104 shown in FIG. 10 is set to the shown "N" side, the switch 317 of FIG. 9 is turned off to select the forced display mode. Since no signal is supplied from the comparator 310 to the switches 313, the switches 313 are connected to the encoder 316 and the $Y_H$, $C_R$ and $C_B$ signals are inputted to the encoder 316.

The encoder 316 forms from the supplied $Y_H$, $C_R$ and $C_B$ signals a video signal which conforms to the television signal specified by, for example, an NTSC system, and a standard-quality still image is displayed on a standard-image-quality monitor (not shown). If the comparator 310 detects the presence of a pilot signal when the automatic display mode is in operation, the $Y_H$, $C_R$ and $C_B$ signals are respectively converted into digital signals by the A/D converters 314 in synchronization with a clock signal which is formed by the PLL circuit 312 on the basis of the pilot signal separated by the BPF 308. The resultant digital signals are memorized in an image memory 315.

Similarly to the signal reproduced from the obverse side of the video floppy disk 301 by the magnetic head 302, the signal reproduced from the reverse side of the video floppy disk 301 by a magnetic head 320 is formed into Y, $C_R$ and $C_B$ signals by being passed through a preamplifier 321, a reproduction processing circuit 322 and LPF's 323, 324 and 325. The resultant Y, $C_R$ and $C_B$ signals are supplied to respective A/D converters 328. In the meantime, a pilot signal is separated from the reproduced signal by a BPF 326, and a clock signal is formed from the separated pilot signal by a PLL circuit 327. The clock signal is supplied to each A/D converter 328, and the Y, $C_R$ and $C_B$ signals which have been supplied in the aforesaid manner are digitized by the respective A/D converters 328 in synchronization with the clock signal. The resultant digital signals are memorized in the image memory 315.

The image data, which have been reproduced from A and C tracks and B and D tracks and digitized by and inputted from the respective A/D converters 314 and 328, are stored at addresses which are specified in order corresponding to the positions of pixels on the image sensor 103 of the recording apparatus shown in FIG. 6. Subsequently, the image data are subjected to interpolation processing by an image processing circuit 329. One example of the interpolation processing by the image processing circuit 329 will be described below with reference to FIG. 11.

Figure 11:
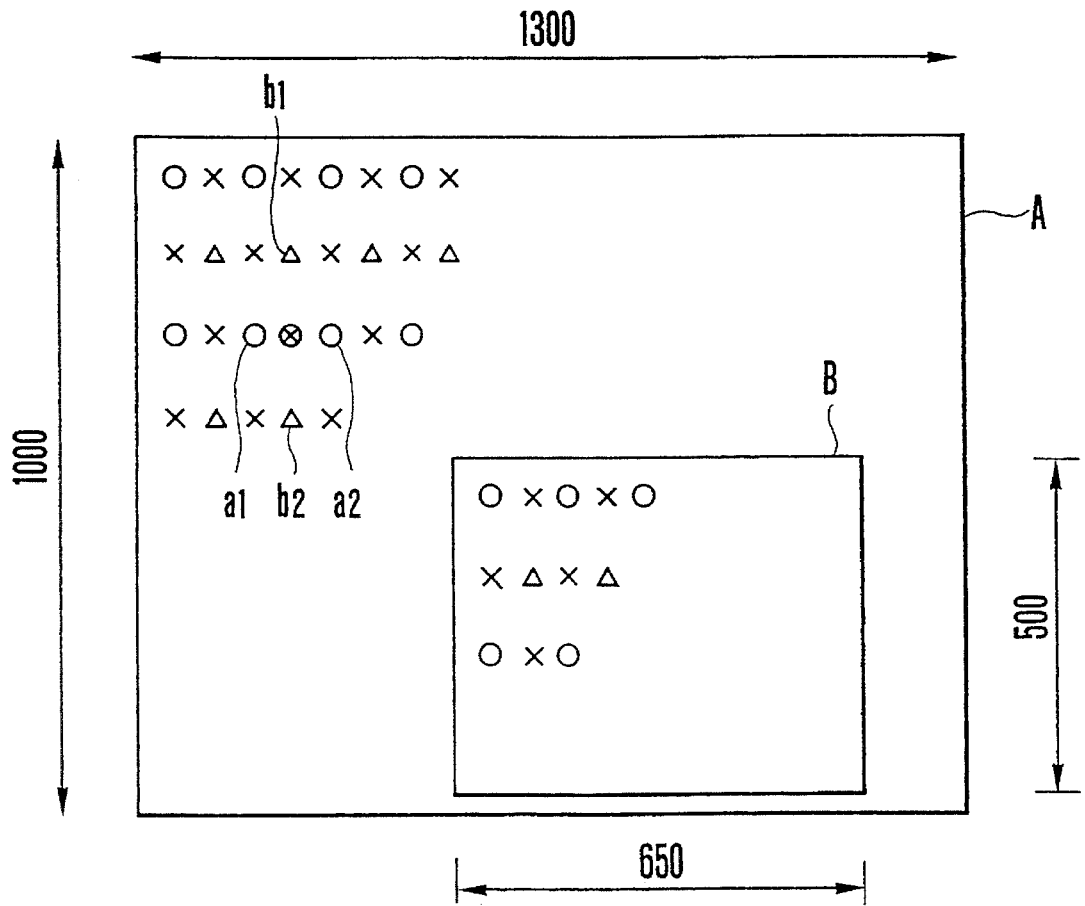
FIG. 11 is a schematic view which is used for explaining the interpolation operation executed by an image processing circuit of the reproducing apparatus of the present embodiment.

FIG. 11 is a schematic view showing the memory address positions of reproduced image data corresponding to the Y signal in a memory space A of the image memory 315. Symbol "o" represents reproduced image data reproduced from the A or C track of the video floppy disk 301 and symbol "Δ" represents reproduced image data reproduced from the B or D track of the video floppy disk 301. The reproduced image data "o" and "Δ" are offset from each other in the horizontal direction by a half pixel in accordance with the positions of pixels on the image sensor 103 of the recording apparatus shown in FIG. 6. Accordingly, to interpolate image data at the middle position between each image data "o" and the adjacent image data "o", for example, image data at the position indicated by "⊗" in FIG. 11, image data $a_1$ and $a_2$ which are on the left and right sides of the position ⊗ as well as image data $b_1$ and $b_2$ which are on the upper and lower sides of the position ⊗ are read from the image memory 315, and the average value of the four image data is calculated by the image processing circuit 329. The average-value data is used to interpolate the image data at the position ⊗. By performing the above-described interpolation processing, it is possible to double the number of horizontal image data.

The image processing circuit 329 forms a $Y_L$ signal ($Y_L$: low-band component of the Y signal) by subjecting the Y signal to the LPF processing of extracting a low-band component from the Y signal by means of a two-dimensional digital filter and also forms a $Y_H$ signal ($Y_H$: high-band component of the Y signal) by performing the arithmetic operation $Y-Y_L$. The formed $Y_L$ and $Y_H$ data are memorized in the image memory 315, and thus the data $Y_L$, $Y_H$, $C_R$ and $C_B$ are stored in the image memory 315. Subsequently, each of the data memorized in the image memory 315 is read out at a predetermined clock rate.

The data $Y_L$, $C_R$ and $C_B$ are respectively converted into data $R_L$, $G_L$ and $B_L$ in a matrix circuit 330. In adders 331, the respective data $R_L$, $G_L$ and $B_L$ are added to the $Y_H$ data read from the image memory 315, converted into analog signals in corresponding D/A converters 332, and outputted as R, G and B signals.

In the apparatus shown in FIG. 9, data for approximately 500 vertical pixels and data for approximately 650 horizontal pixels are read from arbitrary positions in the memory space A of the image memory 315 by means of a readout control circuit (not shown). In other words, if the Y, $C_R$ and $C_B$ data memorized in a memory space B of the image memory 315 are represented as $Y^*$, $C_R^*$ and $C_B^*$ data, each of the $Y^*$, $C_R^*$ and $C_B^*$ data is read out at a rate of 1 H (approximately 63 μs) in the form of data corresponding to one horizontal line by a readout control circuit (not shown). The $Y^*$, $C_R^*$ and $C_B^*$ data are then converted into analog signals by D/A converters 333, respectively, and the converted analog signals are inputted to an encoder 334. The encoder 334 converts the $Y^*$, $C_R^*$ and $C_B^*$ signals supplied from the respective D/A converters 333 into a video signal (*) which conforms to, for example, the NTSC system. The encoder 334 outputs the NTSC video signal as a frame-reproduced image signal. Also, if data for approximately 250 vertical pixels in the memory space B of the image memory 315 are read out every other line by the readout control circuit (not shown), a field-reproduced image signal can be formed.

As is apparent from the foregoing description, according to the above embodiment, data corresponding to 500 or 250 vertical pixels (data for 650 horizontal pixels) are selectively read from arbitrary addresses in an image memory which memorizes image data corresponding to an image having a vertical resolution of the order of 1000 pixels which is equivalent to that of the HDTV system. The read image data are subjected to D/A conversion and converted into a video signal which conforms to an existing TV system such as the NTSC or PAL system. In consequence, an arbitrary portion of a high-definition image can be enlarged by approximately four times for a frame-reproduced image and by approximately eight times for a field-reproduced image, and such an enlarged image can be displayed on a monitor which conforms to the existing TV system.

According to the above embodiment, whether an image signal reproduced from a video floppy disk is an image signal recorded in a CHSV recording mode or a field or frame recording mode is determined on the basis of the presence or absence of a pilot signal in the signal reproduced from the video floppy disk, and the result of the decision is displayed. By making reference to the displayed result, a user can arbitrarily choose a desired monitor for displaying an image signal reproduced through a CHSV system between a monitor which conforms to the CHSV system and a monitor which conforms to an existing TV system. In addition, it is possible to avoid the malfunction of supplying the image signal reproduced through a conventional SV system to a monitor which conforms to the CHSV system.

Further, according to the present embodiment, an image signal recorded in the CHSV recording mode or the field or frame recording mode is forcibly reproduced in a field or frame reproduction mode irrespective of the kind of recording mode, and is outputted to a standard-image-quality monitor. Accordingly, it is possible to solve the above-described problems which may be experienced with the conventional system, and it is also possible to check the contents of a reproduced image on the standard-image-quality monitor only. In addition, since an arbitrary image can be searched within a greatly reduced search time, a highly efficient and convenient system can be realized.

What is claimed is:

1. A high definition image signal recording and reproducing system arranged to record a high definition image signal on a recording medium and to reproduce a recorded high definition image signal from the recording medium, comprising:

(A) recording means for dividing and recording a high definition image signal for one picture on mutually different m pieces of recording tracks (m: integer not less than 3) of said recording medium; and (B) reproduction means for outputting reproduced image signals, arranged to reproduce only the image signals recorded on any one of the mutually different m pieces of recording tracks of the recording medium recorded with the high-definition image signals for one picture at the time of a search reproduction mode in which the high-definition image signals for plural pictures recorded on the recording medium by the recording means are successively reproduced at high speed, and arranged to reproduce the image signals recorded on all of the mutually different m pieces of recording tracks of the recording medium recorded with the high definition image signals for one picture at a time of an ordinary reproduction mode in which the high-definition image signals for plural pictures recorded on the recording medium by the recording means are successively reproduced at a speed lower than the speed at the time of the search reproduction mode.

2. A system according to claim 1, wherein said reproducing means includes:

(a) reproducing head means for reproducing and outputting the high definition image signal for one picture which has been divided and recorded on throughout said mutually different m pieces of recording tracks of the recording medium; and (b) output controlling means for outputting in said search reproducing mode only signals reproduced from one of said mutually different m pieces of recording tracks of said recording medium.

3. A system according to claim 1, wherein said reproducing means includes:

(a) reproducing head means having m reproducing heads for reproducing and outputting high definition image signals which have been divided and recorded on throughout said mutually different m pieces of recording tracks of said recording medium; and (b) output controlling means for outputting in said search reproducing mode only signals reproduced by an optional one among the m reproducing heads of said reproducing head means.

4. A system according to claim 1, wherein the recording medium includes a disk-shaped recording medium, said recording means being arranged to divide and record a high definition image signal on different m concentric recording tracks on the disk-shaped recording medium.

5. A high definition image signal recording and reproducing system arranged to record a high definition image signal on a recording medium and to reproduce the high definition image signal from the recording medium, comprising:

(A) recording means having a first recording mode for recording a first low definition image signal for one picture having a first resolution on a piece of recording track of the recording medium, a second recording mode for recording a second low definition image signal for one picture having a second resolution higher than the first resolution on two pieces of recording tracks of the recording medium, and a third recording mode for recording a high definition image signal for one picture having a third resolution higher than the second resolution on mutually different m (m: integer not less than 3) pieces of recording tracks of the recording medium, said recording means recording the first low definition image signal, the second low definition image signal, or the high definition image signal on the recording medium on the basis of either one of said first, second and third recording modes; and (B) reproduction means for outputting reproduced image signals, arranged to reproduce only the image signal recorded on one piece Of the recording tracks for each picture irrespective whether the recording mode is the first, the second or the third recording mode under which the image signals are recorded on the recording medium by the recording means at the time of a search reproduction mode in which the image signals for plural pictures recorded on the recording medium by the recording means are successively reproduced at high speed, and arranged to reproduce all of the image signals recorded on the recording tracks of the recording medium according to the recording mode under which the image signals for respective pictures are recorded at the time of an ordinary reproduction mode in which the image signals for plural pictures recorded on the recording medium by the recording means are reproduced at a speed lower than the speed at the time of the search reproduction mode.

6. A system according to claim 5, wherein said recording means is arranged to record the high definition image signal together with a discrimination signal for discriminating the recording mode on the recording track of the recording medium in said third recording mode.

7. A system according to claim 6, wherein said reproducing means includes:

(a) reproducing head means for reproducing and outputting the signal recorded on the recording track of the recording medium; and (b) detecting means for detecting whether the image signal reproduced by said reproducing head means is an image signal recorded by said recording means in accordance with the first recording mode, an image signal recorded by said recording means in accordance with the second recording mode, or an image signal recorded by said recording means in accordance with the third recording mode, on the basis of the discrimination signal recorded on the recording track together with the image signal.

8. A system recording to claim 7, wherein said reproducing means further includes:

(a) memory means for storing a signal reproduced from mutually different m recording tracks of the recording medium when said detecting means detects that the image signal reproduced by said reproducing means is an image signal recorded on the basis of the third recording mode by said recording means; and (b) image signal forming means for forming and outputting a high definition image signal for one picture by using the image signal stored in said memory means after said memory means has stored the signals reproduced from the mutually different m recording tracks of the recording medium.

9. A system according to claim 5, wherein the recording medium includes a disk-shaped recording medium, said recording means being arranged to divide and record the high definition image signal on different m concentric recording tracks of said disk-shaped recording medium on the basis of the third recording mode.

* * * * *